Jan. 8, 1952     C. G. FLOUNDERS     2,581,948
LOCK FOR TROLLEY WHEELS

Filed Aug. 7, 1947

INVENTOR
CLEMENT G. FLOUNDERS
BY
*Barr, Borden & Fox*
ATTORNEYS

Patented Jan. 8, 1952

2,581,948

UNITED STATES PATENT OFFICE 2,581,948

LOCK FOR TROLLEY WHEELS

Clement G. Flounders, Philadelphia, Pa.

Application August 7, 1947, Serial No. 767,261

2 Claims. (Cl. 105—150)

The present invention relates to trolley hangers for suspended loads and more particularly to a novel locking unit for retaining the trolley in a selected position upon a rail.

In trolley hangers, as heretofore constructed for transporting suspended sides of beef, or other loads in railway freight cars, it has been the usual practice to hang the load on fixed hooks within the car, which therefore requires removing the load by hand from the trolley and carrying it to a hook within the car. This involves considerable manual labor and loss of time in loading freight cars with present day equipment.

Some of the objects of the present invention are: to provide an improved trolley for supporting and conveying suspended loads; to provide a novel trolley wherein provision is made for anchoring the trolley in a selected position upon a tram rail; to provide a trolley of the suspended load type which, with provision of tram rails in a freight car, can be rolled into such car on the rails and locked in position, so that motion of the car in transit can not displace the trolley and its load; to provide a lock slidably mounted on the hanger of a trolley in order to be manually moved into locking relation with a tram rail; and to provide other improvements as will hereinafter appear.

Figure 1:
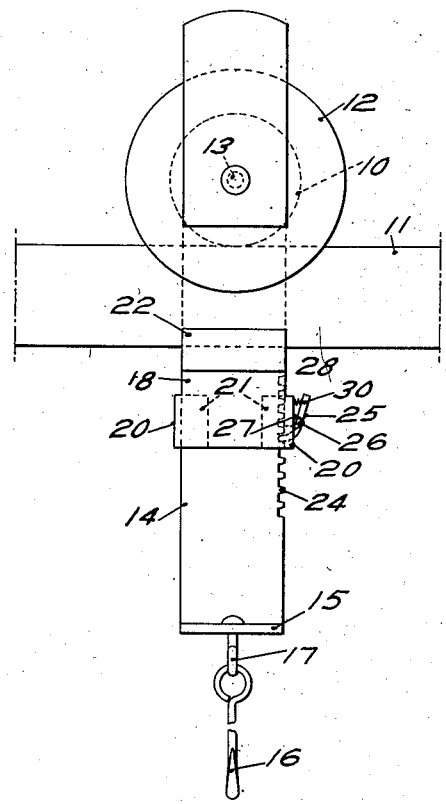
Figure 2:
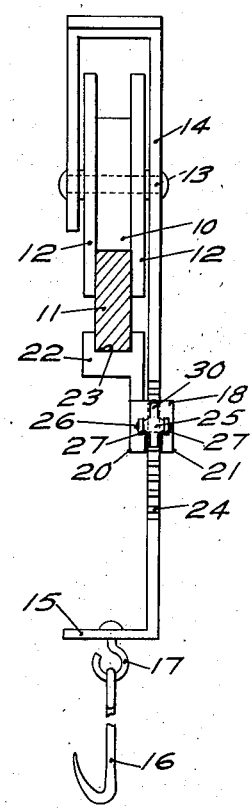
Figure 3:
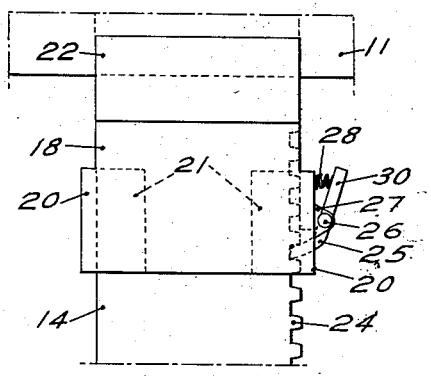
Figure 4:
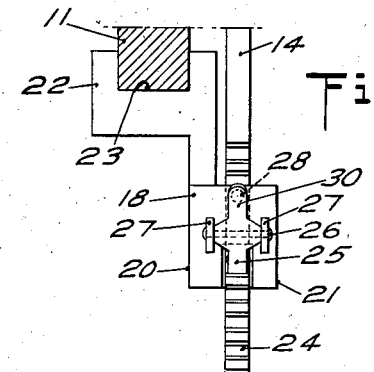

In the accompanying drawings Fig. 1 represents a side elevation of a trolley hanger and lock therefor embodying one form of the present invention; Fig. 2 represents an end elevation of the same; Fig. 3 represents one enlarged detail of the locking unit shown in front elevation; and Fig. 4 represents one enlarged detail in end elevation of the parts shown in Fig. 3.

Referring to the drawings Figs. 1 and 2 show a wheel having a tread surface 10 to ride on a tram rail 11 and to be retained thereon by circular side flanges 12 which straddle the rail to prevent displacement of the wheel. The wheel is mounted to rotate on a fixed shaft 13 carried by a U-shaped frame, one leg 14 of which depends beside the rail and extends a convenient distance below the rail to terminate in an arm 15, which is laterally disposed beneath the rail 11 to bring any weight attached thereto in substantial alinement with the medial line of the wheel. The arm 15 serves as a support, in the present instance, for a meat hook 16 which is removably attached to the arm by a suitable ring 17. It will be understood that other weight suspending means may be employed since the invention is not limited to trolley conveyed meat but comprehends the supporting and handling of various suspended loads.

In order to lock the trolley hanger to the rail 11, the leg 14 is preferably in the form of a flat bar to mount a lock body 18 for sliding movement vertically thereon, such sliding movement being made possible by forming the body 18 at one side with two offset extensions 20 which terminate respectively in inwardly turned guides 21, spaced apart and juxtaposed. The dimensions of the recess formed by the body 18 and the guides 21 is such as to fit snugly about the leg 14, but allow movement lengthwise thereof as required in use. One side of the body 18, at a location, preferably spaced vertically above the guides 21, is formed with a bifurcated locking piece 22 forming an upwardly disposed slot 23 located in alinement with the rail 11 and dimensioned to receive the bottom of the rail therein.

For locking the body 18 in a selected position upon the leg 14 of the wheel frame, one side edge of the leg 14 is formed with a rack 24 in order to be engaged by a pawl 25 pivotally mounted upon a pin 26 fixed to a pair of ears 27 projecting from a side of the locking body 18. A compression coil spring 28 mounted between the extended end 30 of the pawl 25 and the body 18 to thereby bias the pawl 25 to engaging position with the rack 24. This end 30 serves as a thumb release for the pawl 25 and thereby allows the body 18 to be moved relative to the leg 14, either to lock or unlock the body 18 from contact with the rail 11.

In operation the pawl 25 can be released by thumb pressure upon its spring biased end and the locking body either moved up to bear against the rail 11 as a lock to hold the wheel hanger against movement, or moved down to release the lock and allow the trolley wheel to travel along the rail to its destination. When in locked position the operative length of the lock piece 22 is such as to resist any tendency of the suspended load, to swing laterally, an action which otherwise might release the wheel. Furthermore any wear on the lock piece 22 can be taken up by shifting the pawl 25 to engage another tooth of the rack 24.

By the present invention it is now possible to equip freight cars with overhead tram rails leading to a loading and unloading door so that the trolley with its load can be run directly into the car and locked in place for transit. Thus a plurality of loaded trolleys can be located in an orderly manner in the car with all danger of breaking loose eliminated to cause damage.

It will now be apparent that a novel unitary trolley hanger and lock have been devised whereby any such hanger, loaded or unloaded can be locked in position upon a tram rail, the lock being

I claim:

1. In a carrier for suspended loads, a trolley wheel for supported running engagement with a tram rail, a frame for journalling said wheel, an extension of said frame arranged to project downwardly below said rail when said wheel is mounted thereon for attaching a load to be transported, a locking piece vertically slidable on the projecting portion of said extension to engage the bottom of said rail to lock said wheel against said rail, and complemental latching members mounted respectively on said piece and said projecting portion of said extension for releasably retaining said piece in locking position.

2. In a carrier for suspended loads, a trolley wheel for supported running engagement with a tram rail, a frame for journalling said wheel, an extension of said frame arranged to project downwardly below said rail when said wheel is mounted thereon for attaching a load to be transported, a rack on said extension, a locking piece vertically slidable on the projecting portion of said extension to engage the bottom of said rail to lock said wheel against said rail, and latch means on said piece including a spring pressed pawl engaging said rack for retaining said piece in locking position.

CLEMENT G. FLOUNDERS.

REFERENCES CITED

The following references are of record in the file of this patent:

UNITED STATES PATENTS

| Number | Name | Date |
|---|---|---|
| 727,591 | Cook | May 12, 1903 |
| 812,861 | Martin | Feb. 20, 1906 |
| 840,283 | Adams et al. | Jan. 1, 1907 |
| 913,642 | Hood | Feb. 23, 1909 |
| 1,383,383 | Broga | July 5, 1921 |
| 1,614,842 | Kruckenberg et al. | Jan. 18, 1927 |
| 1,778,332 | Meyer | Oct. 14, 1930 |
| 2,134,755 | Frank et al. | Nov. 1, 1938 |
| 2,265,385 | Martin | Dec. 9, 1941 |